(No Model.)
A. J. COOPER.
COAL AND ROCK DRILLING MACHINE.
No. 565,840. Patented Aug. 11, 1896.
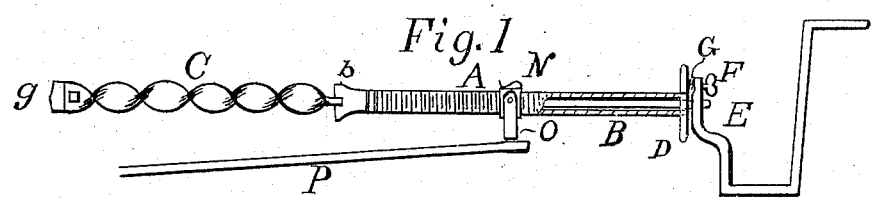
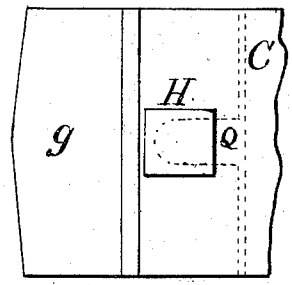
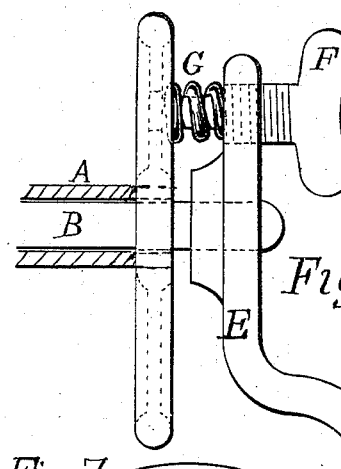
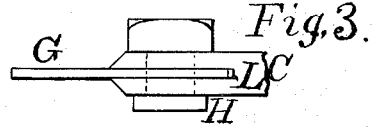
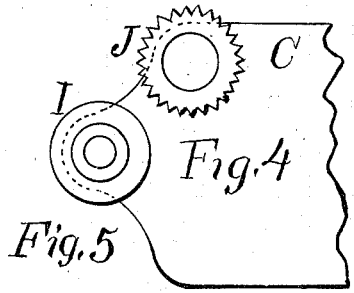
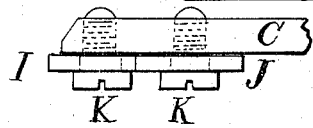
WITNESSES:
E. B. Patterson
K. M. Benjamin
Alfred J. Cooper
INVENTOR.
BY C. R. Patterson
ATTORNEY.

United States Patent Office.

ALFRED J. COOPER, OF DURYEA, PENNSYLVANIA.

COAL AND ROCK DRILLING MACHINE.

SPECIFICATION forming part of Letters Patent No. 565,840, dated August 11, 1896.

Application filed March 27, 1896. Serial No. 585,068. (No model.)

*To all whom it may concern:*

Be it known that I, ALFRED J. COOPER, a citizen of the United States, residing at Duryea, in the county of Luzerne and State of Pennsylvania, have invented certain new and useful Improvements in Coal or Rock Drilling Machines, and I do declare the following to be a full, clear, and exact description of the invention, such as will enable others skilled in the art to which it appertains to make and use the same, reference being had to the accompanying drawings, and to the letters of reference marked thereon, which form a part of this specification.

My invention relates to mine-drilling machines; and it consists of a hollow threaded cylinder A with hand-wheel D, with solid center, in which holes are drilled for the end of the thumb-screw F to enter, and a spring G on the thumb-screw with the shaft B, with handle E, through one end of which is the thumb-screw F, and on the other end of the shaft is a socket to set in the drill, and of a cutting-bit $g$, made of thin steel, to set into the slot L in the end of the auger C, with bolt H for any hard substances; also a bit, as in Figure 4, with wheels I and J set onto the side of the point of the auger or onto an interchangeable bit for cutting coal.

The object of my invention is to make a machine that will drill coal or other hard substances and at the same time to save expense and labor of taking the drills to the blacksmith. The object of the round cutter is to give continually a new cutting-surface to operate on the coal and to furnish a machine that has all of the necessary requirements and at the same time to be light and portable. The straight bits, being thin, will cut longer and the round bits, being round, will rotate and bring a new cutting-edge to bear on the coal, and when worn on one side may be turned over and give another cutting-edge, saving files to sharpen the same, and being cut out of thin steel are much cheaper than to use the end of the auger to cut.

Fig. 1 represents the machine in position for work, with break in the screw-cylinder to show the drill-shaft. Figs. 2 and 3 show the slotted end of the auger C and the thin end of the cutting-bit $g$. Figs. 4 and 5 show the end of the auger C, with rotary cutting-wheels I and J. Figs. 6 and 7 show the threaded cylinder A, with the drill-shaft B and the handle E, set-screw F, and friction-spring G, and holes M M.

A is a hollow screw or cylinder working through a nut N, which is hung in a yoke O, which is set into the bar P, with swivel, thereby enabling the operator to turn the drill to drill a hole in any direction. The bar P is set into the coal by drilling a small hole with a hand-drill of the same style as the drills shown and setting the bar therein.

On one end of the shaft L is a socket $b$ for connecting the drill C, and on the other end is a handle or crank E. This shaft passes through the threaded cylinder A, on one end of which is a hand feed-wheel D, of suitable size, the center of which is a solid web, against which the spring G is pressed to create a friction to feed the drill according to the hardness of the material drilled. In drilling coal it sometimes happens that a piece of rock or a piece of sulfur deposit is encountered. When the miner desires a machine to feed slower, with this device in drilling coal, the set-screw F is screwed in so that the end, which is made like a pin, enters the hole M in the hand-wheel, when the screw-cylinder revolves with the crank E and the feed is positive and feeds at each turn the depth of one thread, but when a hard spot is struck the operator turns the set-screw F back until the pin is disconnected from the wheel, but the spring G acts on the wheel D as a brake, turning the same by friction, the pressure being regulated by the screw, or when the screw F is turned back so that the spring is free from the wheel then the wheel can be turned by hand, thus regulating the feed at pleasure for drilling any material that comes in the way, enabling the operator to have the full control of his machine. Also in Figs. 2 and 3 is shown the end of the auger, slotted as at L, with bit of thin steel G of the proper shape for cutter, with slot for bolt, as shown by dotted lines at Q, fastened by the bolt H, thus enabling the operator to take out a cutter at any time it is dull or broke and insert a new one, avoiding the necessity of going to the blacksmith-shop with the drill to be sharpened, and enabling him to put in a point to suit the material to be worked without having different drills to carry around.

In Figs. 4 and 5 are shown my rotary cutters, which I make with smooth edge and toothed edge, and which are fastened to the end of the drill C by screws passing through the center and into the flat part of the drill, and are fastened to the drill by a screw through the center which holds them in place. When the cutting-surface on one side is dulled, the workman by loosening the screw and rotating the round bit a part of a turn, brings a new cutting-surface to act upon the material he is working on. When he has used the whole of one side until it is dull, by removing the screw he is enabled to reverse the round cutter, thus bringing a new cutting-surface, thereby enabling him to do a greater amount of work before going to the blacksmith-shop to have his drill sharpened. In fact, it does away with going out to get drills sharpened, as the cutting-bit is simply a little thin piece of steel, a number of which he can carry in his pocket.

Having thus fully described my invention, what I claim, and wish to secure by Letters Patent, is—

1. In a coal or rock drilling machine, the combination with the pivoted nut, the hollow screw-threaded cylinder and the drill-rod extending therethrough, of the hand-wheel mounted on said cylinder the crank on the drill-rod provided with a set-screw adapted to positively engage said hand-wheel, and a spring interposed between the crank and hand-wheel and mounted on the set-screw, whereby a positive or friction feed is provided, all substantially as described and set forth.

2. In a coal or rock drilling machine the twist or auger bit in combination with the thin, flat, round cutters fastened to the drill-twist with screw in the center, in such a manner as to admit of loosening the screw and rotating the cutter to bring new cutting edge into use when required, all substantially as described and set forth.

In testimony whereof I affix my signature in presence of two witnesses.

ALFRED J. COOPER.

Witnesses:
K. M. BENJAMIN,
E. B. PATTERSON.